C. EMMANUEL.
Astronomical Insrument.
No. 45,954.
Patented Jan. 17, 1865.
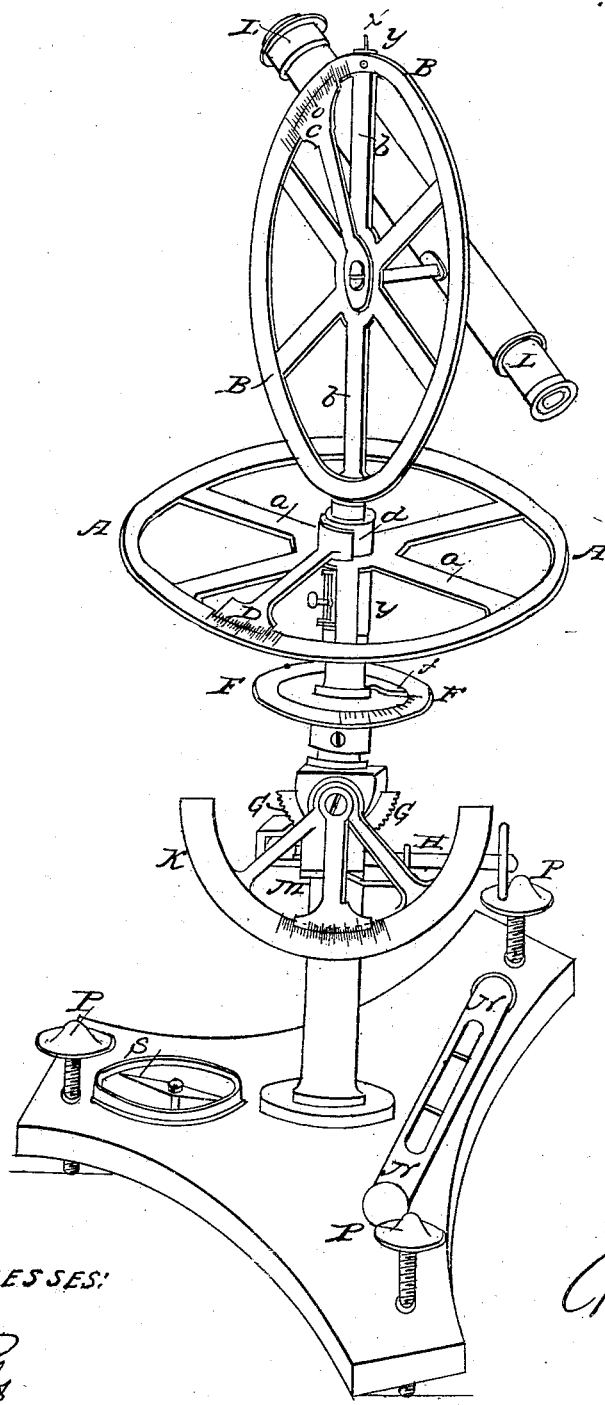

UNITED STATES PATENT OFFICE.

CHARLES EMMANUEL, OF PARIS, FRANCE.

IMPROVEMENT IN ASTRONOMICAL INSTRUMENTS.

Specification forming part of Letters Patent No. 45,954, dated January 17, 1865.

*To all whom it may concern:*

Be it known that I, CHARLES EMMANUEL, of Paris, in the Empire of France, have invented certain new and useful Improvements in Astronomical Apparatus, called "Portable Astronomical Pantoscope"; and I hereby declare that the following is a full, clear, and exact description of the same, reference being had to the accompanying drawings.

This invention consists of an astronomical instrument, termed by the inventor a "pantoscope," in which three instruments—videlicit, a theodolite, an equatorial, and an ecliptic instrument—are combined—that is to say, it affords the means of ascertaining immediately the position of the heavenly bodies in relation to the horizon, the equator, and the ecliptic. With regard to its being a theodolite and an equatorial, it combines and simplifies these two instruments. With regard to its being an ecliptic instrument, it is entirely new, for no instrument has hitherto been constructed to indicate or ascertain the latitudes and longitudes of the heavenly bodies—that is to say, their position in relation to the plane of the ecliptic.

The general construction of the instrument will be understood on reference to the accompanying drawings. The chief parts of which it is composed are a graduated semi-circle, K, and two graduated circles, A and B, the latter of which supports a telescope or other similar instrument, L. The circles A B are always perpendicular to each other, and are free to receive the inclinations required by the latitude of the place and the obliquity of the ecliptic. Each of them is also free to turn round the rod which sustains it.

D C M are three indexes or verniers for indicating angles on the two circles A B and the semi-circle K, respectively.

N is a liquid-level, and P screws for verifying the vertical position of the instrument.

S is a compass for guiding the semi-circle K into the plane of the meridian. The circle A can occupy a position parallel to the horizon, the equator, or the ecliptic. In addition to being graduated, its circumference is marked with the twelve signs of the zodiac and with fixed points to indicate the principal stars of the equator.

*a a* is the diameter of the circle A, which is inclined at an angle of 23° 28' in round numbers in a slide. *d* is a collar, by means of which the circle A turns on its own center. *e* is a pressure-screw, to raise or lower in its groove the pin which allows the circle A to be inclined to 33° and returned to its natural position. The circle B is free to turn. A vertical style, *x*, placed on the top of this circle, denotes the time on the small plate *y* of the circle. The telescope L is free to turn on the center of the circle B, and carries the pointer C with it. F is a small fixed circle to preserve an indication of the position of the meridian, and *f* is a pointer of that circle, free to turn with the central rod which supports the circle A, and which enters the sheath *g*. G is a toothed sector, worked by a screw, H, and serving to incline the instrument according to the latitude of the place of observation.

When the index M of the semi-circle K is at zero on the graduation, the circle A is horizontal. It coincides with the plane of the horizon because, being parallel to it, it has, like it, the zenith and the nadir for poles. The circle B is vertical, and, as it is free to turn round the central axis of the instrument, it coincides successively with all the vertical lines of the heavens, while the telescope which it supports at its center always describes horizontal circles. The instrument in this position represents a theodolite, and serves to measure azimuths, meridional heights, and all other heights above the horizon, to take the parallax of a terrestrial object, and for use generally as ordinary theodolites.

When, by means of the mechanism G H, the index M of the graduated semi-circle is led over the figure indicating the latitude of the place of observation, the central axis of the instrument takes the same direction as the axis of the earth. The circle A coincides with the plane of the celestial equator, for it has the same two poles—the Arctic and the Antarctic. The circle B is a horal circle, and the telescope, whatever be its inclination, describes circles parallel to the equator. The instrument is therefore in this position an equatorial, and may be employed to measure declinations and right ascensions and to ascertain the solar hour or the sidereal hour by the horal angle of the sun or of the stars.

Lastly, when the circle A is inclined at an angle of 23° 27' 26".76, (for the year 1863,) it coincides with the ecliptic, because the two planes, which are parallel, have the same axis and the same poles, or the poles of the terrestrial orbit. The circle B, turning on its pivot, corresponds successively to all the circles of latitude of the heavens, and the telescope L describes circles parallel to the plane of the earth's orbit. The instrument, therefore, is now an ecliptic instrument, and may be employed to ascertain the latitude of the heavenly bodies and the angle which their circle of latitude makes with the meridian of the place. It also indicates the longitudes of the heavens by the means about to be described. For this purpose I mark on the circle A, which is already divided into three hundred and sixty degrees—the twelve signs of the zodiac—one of which, that of the ram, contains the point from which the longitudes and right ascensions commence. The graduated circle is thus divided into twelve parts, equal to the twelve divisions of the celestial ecliptic, which is nothing but the trace in the sky of the plane of the orbit which the earth describes in twelve months round the sun. If, then, the zodiac of the graduated circle be made to correspond to the celestial zodiac, the two equinoxes of the one facing the two equinoxes of the other, the instrument indicates the places where each of the constellations commences and finishes, and therefore denotes the longitudes. By making the rod which supports the circle, and which is always parallel to the earth's axis, turn in its sheath g, the axis of the circle will describe round a prolongation of the rod a cone in every way similar to the cone which the axis of the celestial ecliptic seems to describe in a day round the earth's axis. The plane of the graduated circle occupies successively all the various positions that the ecliptic seems to occupy in twenty-four hours above the horizon; or, if the circle be moved by clock-work at a speed proportional to the speed of the earth's rotation, its twelve divisions will always coincide with the twelve divisions of the ecliptic.

It is evident that the same means which give a direct indication of the longitudes of the heavens when the instrument acts as an ecliptic instrument ought to give indications of right ascensions when it acts an an equatorial. Two of the signs of the zodiac—the ram and the balance—have always one of their points situated in the plane of the celestial equator. If, then, the vernal point of the instrument be made to correspond to the celestial equinox, (the zero of right ascensions,) which may be easily done by marking on the graduated circle points corresponding to the principal stars of the equator, the right ascension of the heavenly body observed will be indicated on the circle as readily as its horal angle.

The instrument before described may be used in its entirety as a theodolite, an equatorial, and ecliptic instrument, or it may be constructed for use for one or two of those purposes only. Instead of the circles A and B semi-circles may be employed.

And, having now described the nature of the said invention and in what manner the same is to be performed, I claim—

The astronomical instrument herein described, in which a theodolite, an equatorial, and an ecliptic instrument are combined, affording the means of ascertaining immediately the positions of the heavenly bodies in relation to the horizon, equator, and the ecliptic, substantially in the manner herein set forth.

In testimony whereof I have signed my name to this specification before two subscribing witnesses.

CHARLES EMMANUEL.

Witnesses:
E. SHERMAN GOULD,
E. JAUME.